(12) United States Patent
Vandermeijden (10) Patent No.: US 10,203,806 B2
(45) Date of Patent: *Feb. 12, 2019

(54) LOW GROUND MASS ARTIFACT MANAGEMENT

(71) Applicant: Synaptics Incorporated, San Jose, CA (US)

(72) Inventor: Tom Vandermeijden, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/411,611

(22) Filed: Jan. 20, 2017

(65) Prior Publication Data
US 2017/0131843 A1    May 11, 2017

Related U.S. Application Data (63) Continuation of application No. 14/580,000, filed on Dec. 22, 2014, now Pat. No. 9,582,112.

(60) Provisional application No. 61/968,962, filed on Mar. 21, 2014.

(51) Int. Cl.
    *G06F 3/044* (2006.01)
    *G06F 3/041* (2006.01)

(52) U.S. Cl.
    CPC .......... *G06F 3/0418* (2013.01); *G06F 3/044* (2013.01)

(58) Field of Classification Search
    CPC ......... G06F 3/041; G06F 3/0418; G06F 3/044
    See application file for complete search history.

(56) References Cited

U.S. PATENT DOCUMENTS

| | | |
|---|---|---|
| 4,573,018 A | 2/1986 | Mirow |
| 5,945,980 A | 8/1999 | Moissev et al. |
| 8,054,300 B2 | 11/2011 | Bernstein |
| 2005/0077469 A1 | 4/2005 | Kaushal |
| 2008/0157782 A1 | 7/2008 | Krah |
| 2008/0158183 A1 | 7/2008 | Hotelling et al. |
| 2009/0160787 A1 | 6/2009 | Westerman et al. |
| 2009/0284495 A1 | 11/2009 | Geaghan et al. |

(Continued)

OTHER PUBLICATIONS

Office Action in related U.S. Appl. No. 14/580,000 dated Jul. 28, 2016. (39 pages).

*Primary Examiner* — Antonio Xavier
(74) *Attorney, Agent, or Firm* — Ferguson Braswell Fraser Kubasta PC (57) ABSTRACT

A processing system for a capacitive sensing device includes a sensor module and a determination module. The sensor module is coupled to transmitter electrodes and receiver electrodes. The sensor module is configured to transmit transmitter signals with the transmitter electrodes and receive resulting signals with the receiver electrodes. The resulting signals include effects corresponding to the transmitter signals. The determination module is configured to determine response values from the resulting signals, and determine a first adjusted response value by applying a negative multiplier to a first response value of the response values. The first response value is a negative value. The determination module is further configured to determine positional information for a first input object based on at least one of the first adjusted response value and a second response value of the response values, and report the positional information. The second response value is a positive response value.

22 Claims, 5 Drawing Sheets

(56) References Cited

U.S. PATENT DOCUMENTS

| | | |
|---|---|---|
| 2010/0001973 A1 | 1/2010 | Hotelling et al. |
| 2010/0060608 A1 | 3/2010 | Yousefpor |
| 2010/0164889 A1 | 7/2010 | Hristov et al. |
| 2010/0245286 A1 | 9/2010 | Parker |
| 2010/0292945 A1 | 11/2010 | Reynolds et al. |
| 2011/0006832 A1 | 1/2011 | Land et al. |
| 2011/0025629 A1 | 2/2011 | Grivna et al. |
| 2011/0061949 A1 | 3/2011 | Krah et al. |
| 2011/0084936 A1 | 4/2011 | Chang et al. |
| 2011/0175823 A1 | 7/2011 | Vieta |
| 2012/0043971 A1 | 2/2012 | Maharyta |
| 2012/0081335 A1 | 4/2012 | Land et al. |
| 2013/0030740 A1 | 1/2013 | Bulea |
| 2013/0069905 A1 | 3/2013 | Krah et al. |
| 2013/0173211 A1 | 7/2013 | Hoch et al. |

LOW GROUND MASS ARTIFACT MANAGEMENT

CROSS-REFERENCE TO RELATED APPLICATIONS

The present application is a continuation application of and, thereby, claims benefit under 35 U.S.C. § 120 to U.S. application Ser. No. 14/580,000, entitled, "Low Ground Mass Artifact Management," filed on Dec. 22, 2014, and incorporated herein by reference. U.S. application Ser. No. 14/580,000 claims priority under 35 U.S.C. § 119(e) to U.S. Provisional Patent Application Ser. No. 61/968,962, filed on Mar. 21, 2014 and entitled, "Low Ground Mass Artifact Reduction." U.S. Provisional Patent Application Ser. No. 61/968,962 is incorporated herein by reference in its entirety.

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments of the invention relate to a processing system for a capacitive sensing device. The processing system includes a sensor module and a determination module. The sensor module is coupled to transmitter electrodes and receiver electrodes. The sensor module is configured to transmit transmitter signals with the transmitter electrodes and receive resulting signals with the receiver electrodes. The resulting signals include effects corresponding to the transmitter signals. The determination module is configured to determine response values from the resulting signals, and determine a first adjusted response value by applying a negative multiplier to a first response value of the response values. The first response value is a negative value. The determination module is further configured to determine positional information for a first input object based on at least one of the first adjusted response value and a second response value of the response values. The second response value is a positive response value. The determination module is further configured to report the positional information.

In general, in one aspect, embodiments of the invention relate to an input device that includes an array of sensor electrodes configured to sense input objects in a sensing region of the input device, and a processing system. The processing system is configured to determine response values from resulting signals received using the array of sensor electrodes, and determine a first adjusted response value by applying a negative multiplier to a first response value of the response values. The first response value is a negative value. The processing system is further configured to determine positional information for a first input object based on at least one of the first adjusted response value and a second response value of the response values, and report the positional information. The second response value is a positive response value.

In general, in one aspect, embodiments of the invention relate to a method for low ground mass artifact management that includes determining response values from resulting signals of a capacitive input device, determining that a first response value of the response values is a negative value, and determining, based on determining that the first response value is the negative value, a first adjusted response value by applying a negative multiplier to the first response value. The method further includes determining positional information for an input object based on at least one of the first adjusted response value and a second response value of the response values, and report the positional information. The second response value is a positive response value.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 4.1 and 4.2 show an example in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention embrace low ground mass artifacts. A low ground mass artifact may appear in the capacitive image by being in an opposite range of the range of a valid input object. In other words, the response value resulting from transmitting transmitter signals and receiving resulting signals is in an opposite range of a valid input object. For example, if the presence of valid input objects is exhibited by positive response values, the presence of low ground mass artifacts is exhibited by negative response values.

In one or more embodiments of the invention, when a response value is in an opposite range of a range of a valid input object, one or more embodiments of the invention apply a negative multiplier to the response value to create an adjusted response value. The negative multiplier causes the response value to be in the range of a valid input object. Further, in one or more embodiments of the invention, the negative multiplier may cause the absolute value of the adjusted response value to be less than the absolute value of the response value. For example, the negative multiplier may be a value between zero and negative one, exclusively.

One or more embodiments of the invention are performed when the ground condition or ground mass environment of the input device is a low ground mass environment. In various embodiments, the ground condition of the input device corresponds to free-space capacitive coupling in series between the input device-universe and the input object-universe. In various embodiments, when the coupling between the input device and the universe (free-space coupling coefficient) is relatively small, the device may be considered to be in a low ground mass state. However, when the coupling between the capacitive sensing device and the universe is substantially larger, the device may be considered to be operating in a good ground mass state. Further, when the coupling between an input object and system ground of the input device is substantially large, the input device may be in a good ground mass condition.

Low ground mass correction may be applied when a low ground mass condition is detected and the input device is operating in a low ground mass mode. Further, when a low ground mass condition is not detected, i.e., a high ground mass condition is detected, the low ground mass correction is not applied. When low ground mass correction is not applied, the sensing device may operate under a normal operating mode. While operating in a normal mode, "N" number of input objects may be detected and reported and, while operating in a low ground mass mode, "M" number of input objects may be detected and reported in accordance with one or more embodiments of the invention. In various embodiments, "N" is greater than "M". For example, "M" may be two and "N" is greater than two. In other embodiments, "M" three and "N" is greater than three. In yet other embodiments, "N" and "M" may be equal. In such embodiments, "M" and "N", may be three or less; however, a higher number of input objects may also possible.

Figure 1:
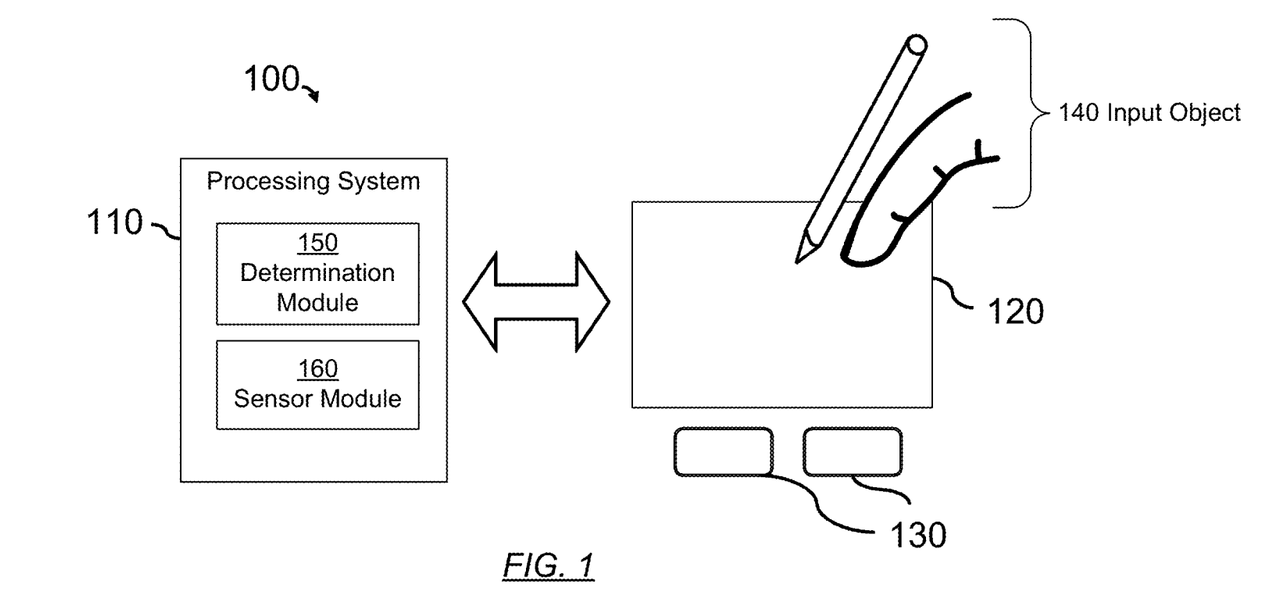
FIG. 1 shows a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of the gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. The effect(s) may be the transmitter signal, a change in the transmitter signal caused by one or more input objects and/or environmental interference, or other such effects. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine a presence of a low ground mass artifact, apply a negative multiplier to the response value caused by the presence of the low ground mass artifact, determine signal to noise ratio, determine positional information of an input object, identify a gesture, determine an action to perform based on the gesture, a combination of gestures or other information, and perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include analog hardware and/or digital elements coupled to a transmitting portion of the sensing elements. The receiver module may include analog hardware and/or digital elements coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in various ways, such that a single module or the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information," as used herein, broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

In various embodiments, when performing transcapacitance and/or absolute capacitance sensing, modulating the sensor electrodes may be referred to as driving the sensor electrode with a varying voltage signal or exciting a sensor electrode. Conversely, sensor electrodes may be connected to a substantially constant voltage (e.g., system ground or substantially constant voltage). Holding electrodes substantially constant may be referred to as connecting the sensor electrodes to a constant voltage signal. In other words, a constant voltage signal includes a substantially constant voltage signal without departing from the scope of the invention. Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

Figure 2:
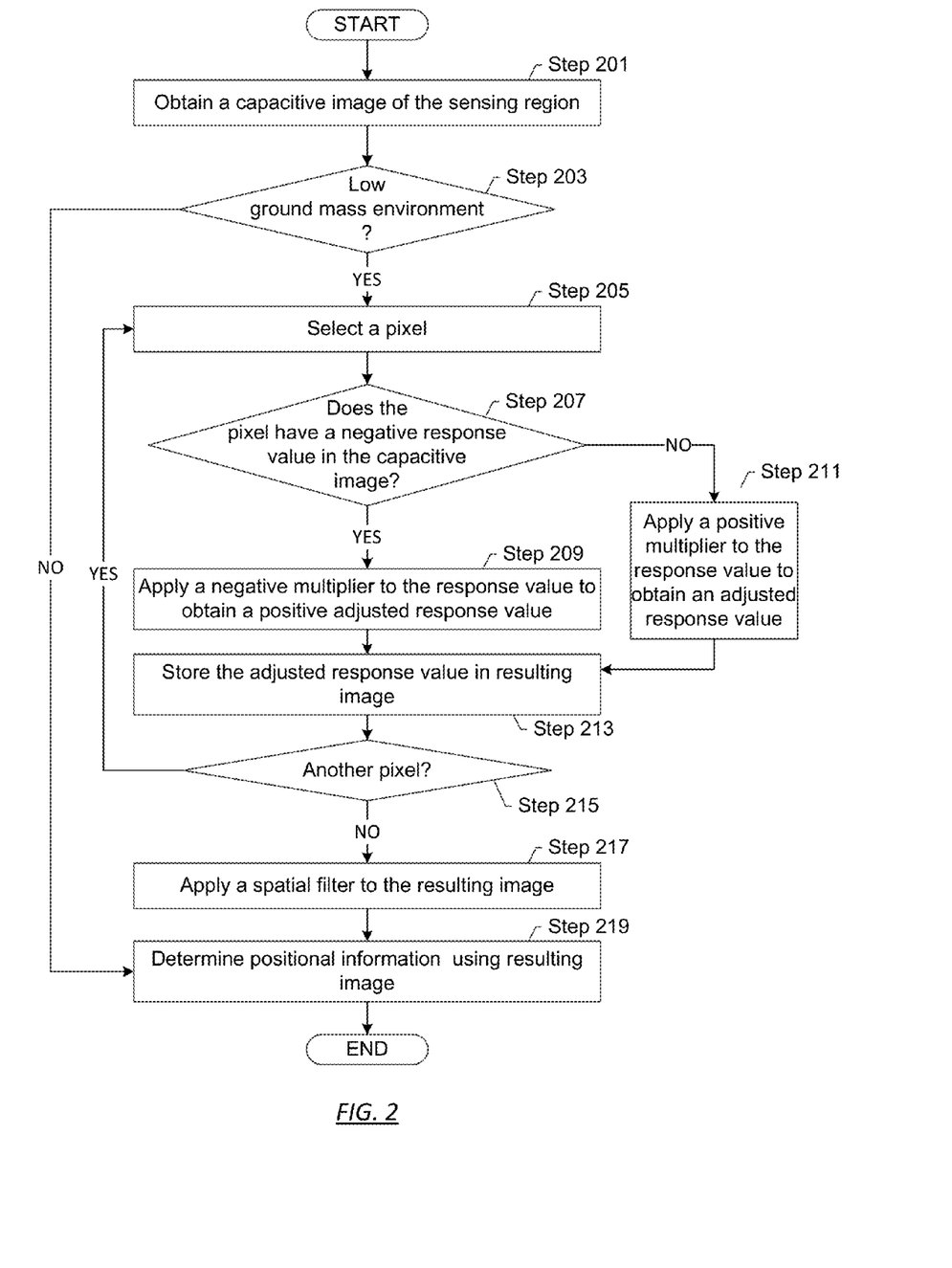
FIGS. 2 and 3 show flowcharts in accordance with one or more embodiments of the invention.
Figure 3:
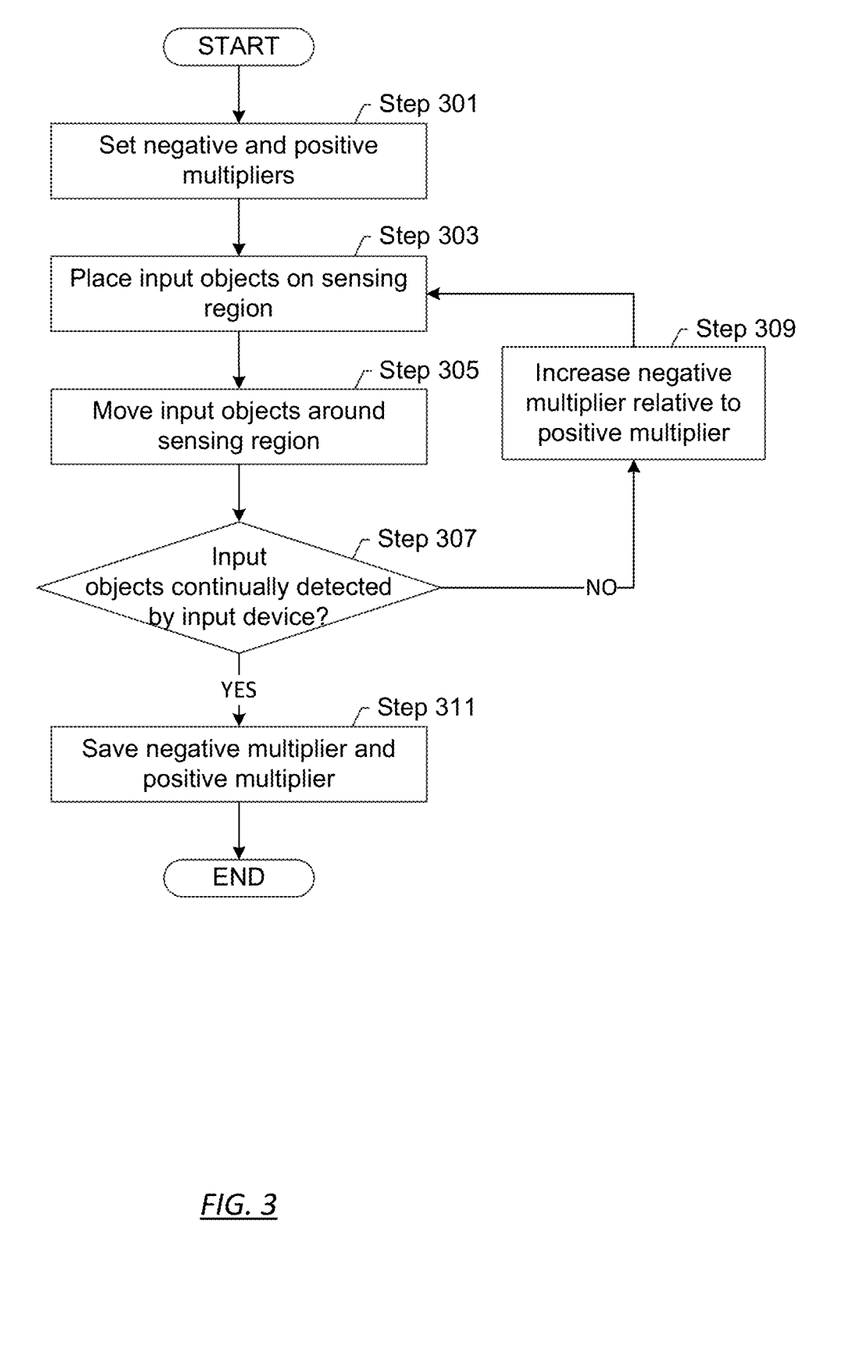

FIGS. 2 and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for processing a capacitive image and detecting a presence of an input object. In Step 201, a capacitive image of the sensing region is obtained in accordance with one or more embodiments of the invention. Obtaining the capacitive image is performed by the transmitter electrodes transmitting transmitter signals. Resulting signals are received by receiver electrodes. The resulting signals include the effects of the transmitter signals, and environmental factors. The resulting signals may be used to detect input objects in the sensing region of the input device. In one or more embodiments of the invention, the resulting signals may be measured to obtain a measurement at each pixel, or intersection of transmitter electrode and receiver electrode. The combination of measurements, which are each associated with the measurement's corresponding pixel location, is the capacitive image.

In Step 203, a determination is made whether a low ground mass environment is detected in accordance with one or more embodiments of the invention. Low ground mass occurs when a capacitance input device does not have sufficient ground. For example, an input device may not have sufficient ground when the input device is on a non-conductive insulated surface and is not connected to the ground. Various techniques known in the art may be used to determine the ground mass environment of the input device. For example, the ground mass environment may be determined as a function of the capacitance between the input object and all sensor electrodes, the capacitance between input object and transmitter electrodes, the capacitance between input object and receiver electrodes, and the free space capacitive coupling in series between the sensor device and the user. The ground mass environment may be determined based on the signal to noise ratio. If the signal to noise ratio of the input device is less than a threshold, then the determination may be made that the input device is detected to be in a low ground environment. As another example, low ground mass may be detected based on negative peaks in the capacitive image. In other words, low ground mass may be detected based on negative measurements. A negative measurement is an opposite measurement of the measurement when an input object is present. In some embodiments, an input object may reduce the measured capacitance between transmitter and receiver electrodes. The reduction of the measured capacitance may be referred to as positive and/or computed as a positive peak. Thus, negative is in reference to a change in capacitance caused by an input object under good ground mass conditions. Because negative capacitance does not exist, a negative peak may be indicative of re-transmission caused by low ground mass. If a low ground mass environment is detected, then one or more embodiments of the invention iterate through the pixels in the capacitive image to create adjusted response values. Alternatively, Step 203 may be omitted and the iteration through pixels may be performed regardless of the ground mass environment.

In Step 205, a pixel is selected in accordance with one or more embodiments of the invention. One or more embodiments may iterate through the capacitive image in virtually any order. Thus, the pixel that is selected may be any unprocessed pixel in the capacitive image.

In Step 207, a determination is made whether the pixel has a negative response value in the capacitive image in accordance with one or more embodiments of the invention. A pixel has a negative response value when the pixel has a value that is in an opposite range of a value of a valid input object. For example, if a valid input object is reflected as having a measurement value greater than zero, then a negative pixel value has a measurement value less than zero. By way of another example, if a valid input object is reflected as having a measurement value less than zero, then a negative pixel value has a measurement value greater than zero. The input device may be preconfigured with information defining the range of the valid input object and the opposite range of the valid input object. Thus, determining whether the pixel has a negative response value may be performed by determining whether the measurement value for the pixel is in the opposite range.

In Step 209, a negative multiplier is applied to the response value to obtain a positive adjusted response value in accordance with one or more embodiments of the invention. Different mathematical techniques may be performed to apply the negative multiplier. For example, if the range of a valid input object is positive numbers, then the mathematical technique applied results in a positive number. In the example, the pixel having a negative value may be multiplied by the negative multiplier (that also has a negative number) to obtain a positive value for the adjusted response value. By way of another example, the pixel having a negative value may be multiplied by the negative multiplier that is a positive number to obtain an intermediate result, which is negative. The absolute value of the intermediate result is taken to obtain the positive value for the adjusted response value. Similar mathematical techniques may be performed to obtain an adjusted response value that is negative in the case in which the range of a valid input object is negative. Other mathematical techniques may be used without departing from the scope of the invention.

In Step 211, if the pixel does not have a negative response value, then a positive multiplier may be applied to the response value to obtain an adjusted response value. In other words, the pixel may have a positive response value indicating that the pixel is in a range of a valid input object or no input object. The positive multiplier may increase the value of the pixel relative to the adjusted value for negative pixels. In one or more embodiments of the invention, the positive multiplier is applied by multiplying the measurement value by a positive number. Step 211 may be optional and may not be performed in one or more embodiments of the invention. For example, the original measurement value may be used.

In one or more embodiments of the invention, in Step 213, the adjusted response value is stored in the resulting image in accordance with one or more embodiments of the invention. In one or more embodiments of the invention, the adjusted response value is associated with the corresponding pixel location in the resulting image when the adjusted response value is stored. In some embodiments, the adjusted response value replaces the original value. In other embodiments, the adjusted response value may be stored in a new image.

In Step 215, a determination is made whether to process another pixel in accordance with one or more embodiments of the invention. Specifically, steps 205-215 may be performed until all pixels in the image are processed in accordance with one or more embodiments of the invention.

In Step 217, a spatial filter is applied to the resulting image in accordance with one or more embodiments of the invention. In one or more embodiments of the invention, the spatial filters are a smoothing of the measurements spatially. Specifically, a pixel's value may be a function of the adjusted response value of the pixel and the adjusted response value of one or more neighboring pixels. Applying a spatial filter may be performed using various techniques known in the art.

In Step 219, positional information is determined using the resulting image in accordance with one or more embodiments of the invention. In one or more embodiments of the invention, the resulting image may have multiple peaks, or positions in which the adjusted response value is greater than the surrounding adjusted response value. Two peaks having the greater adjusted response values are selected as the positions of the input objects. Various techniques known in the art may be performed to determine additional positional information, such as velocity, distance of input object to sensing region, and other positional information.

Although not shown in FIG. 2, at various stages of processing in FIG. 2, the capacitive image or adjusted capacitive image may have additional processing that is known in the art performed. For example, the capacitive image or adjusted capacitive image may be processed to account for noise in the sensing region.

FIG. 3 shows a flowchart for configuring the input device in accordance with one or more embodiments of the invention. Specifically, FIG. 3 shows a flowchart for configuring the positive and negative multiplier. If the negative multiplier is too high as compared to the positive multiplier, then the system may be unable to distinguish between the artifacts and the real input objects. In contrast, if the negative multiplier is too low as compared to the positive multiplier, then the real input objects may disappear or not be reflected in the adjusted capacitive image.

In one or more embodiments, the input device is configured once. Further, the configuration may be performed for only one input device of a particular type and applied to all input devices of the same type. For example, the pattern of electrodes and the stack-up of the input device may affect the negative and positive multiplier. Thus, the manufacturer may obtain the negative and positive multipliers for the particular model of input device and apply the negative and multiple multipliers to each input device of the particular model. Alternatively or additionally, the configuration may be performed multiple times, such as by a user of the input device.

In Step 301, the positive and negative multipliers are set in accordance with one or more embodiments of the invention. In one or more embodiments, the initial multipliers may be set based on experience with other input devices. Other techniques for selecting the initial multipliers may be used. In one or more embodiments of the invention, the initial negative multiplier may be set, for example, as a number between zero and negative one and the positive multiplier may be set as a number greater than one.

In Step 303, input objects are placed on the sensing region in accordance with one or more embodiments of the invention. For example, two fingers may be placed on the surface of the sensing region.

In Step 305, the input objects are moved around the sensing region in accordance with one or more embodiments of the invention. In some embodiments, the two input objects may be moved toward the same horizontal line with reference to orientation of the transmitter and or receiver electrodes. Rather than both input objects moving, one input object may move while the other may remain stationary. Other moves of the input objects based on the layout of the transmitter and receiver electrodes may be performed without departing from the scope of the invention.

In Step 307, a determination is made whether the input objects are continually detected by the input device in accordance with one or more embodiments of the invention. Specifically, a determination is made whether positional information is reported by the input device for both input objects.

If the input objects are not continually detected by the input device, the negative multiplier is increased relative to the positive multiplier in Step 309 in accordance with one or more embodiments of the invention. In other words, one or both of the positive and negative multipliers are adjusted.

In Step 311, if the input objects are continually detected, then the negative multiplier and the positive multiplier are saved in accordance with one or more embodiments of the invention. In one or more embodiments of the invention, the processing system is configured to use the negative multiplier and the positive multiplier. For example, the negative multiplier and positive multiplier may be stored as part of the firmware of the input device.

Figure 41:
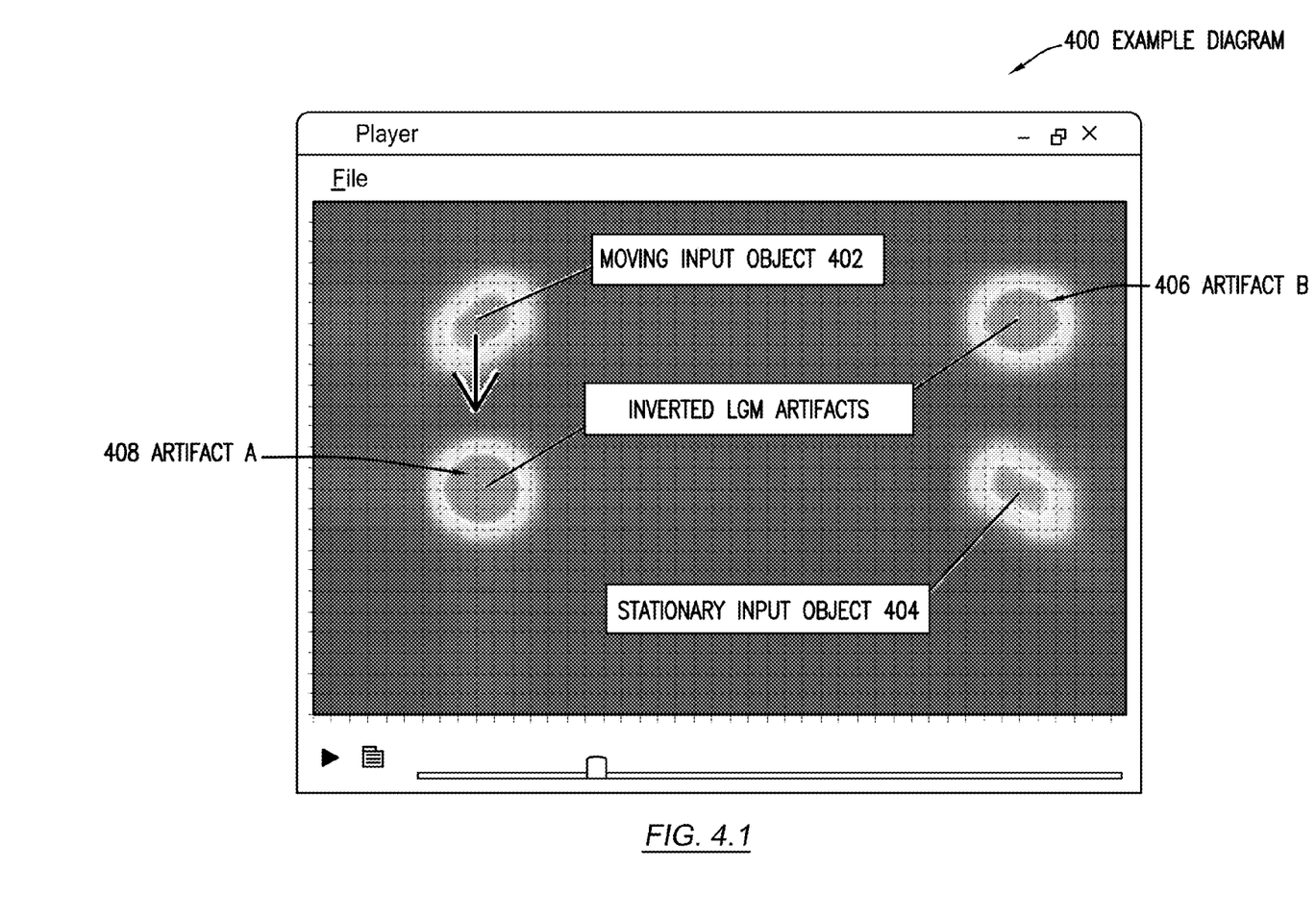
Figure 42:
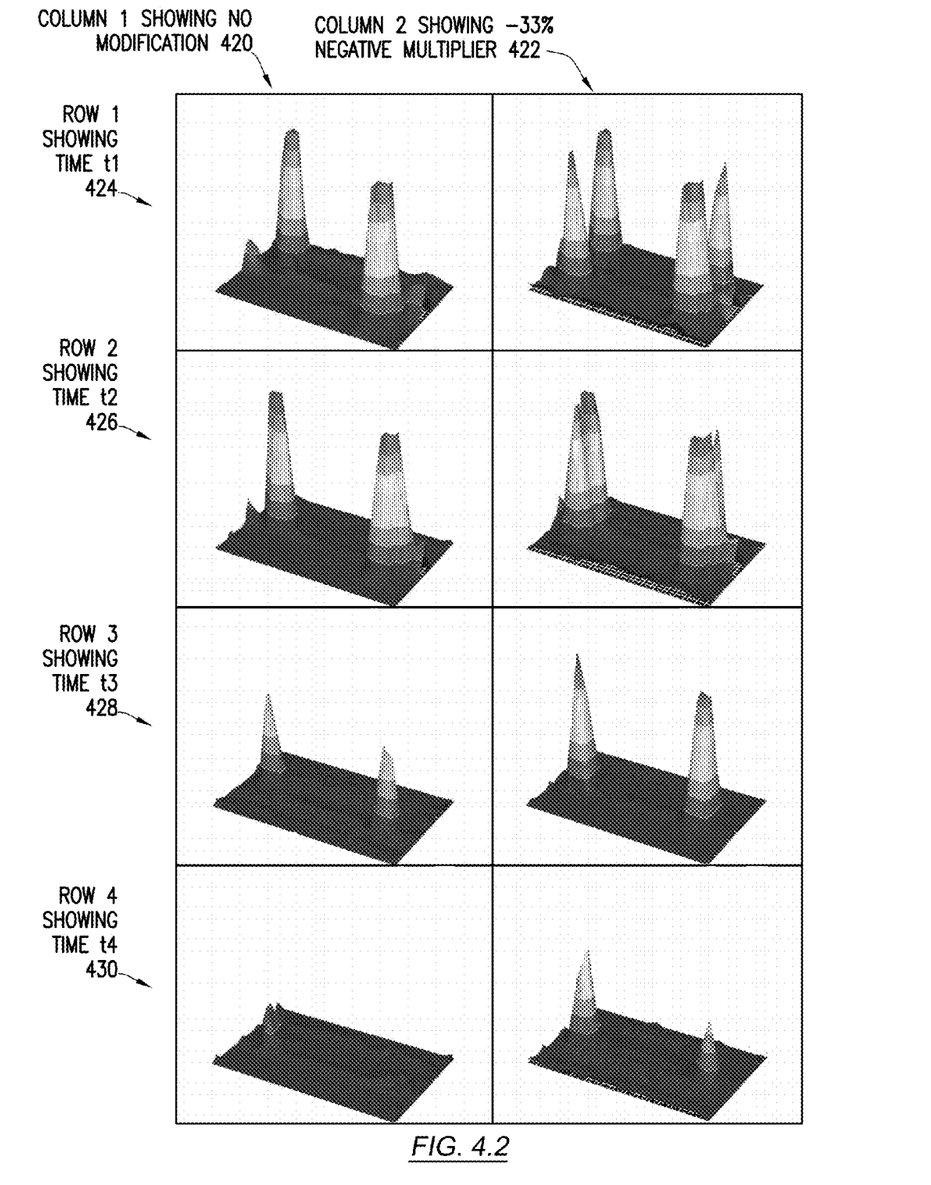

FIGS. 4.1 and 4.2 show an example in accordance with one or more embodiments of the invention. The following example is for explanatory purposes only and not intended to limit the scope of the invention. FIG. 4.1 shows an example diagram (400) of a capacitive image of the sensing region in a low ground mass environment. As shown in the example, a stationary input object (404) is placed on a right and vertically center side of the sensing region and a moving input object (402) is placed on the top left side of the sensing region. The moving input object moves to be on the same horizontal line as the stationary input object. Because of re-transmission, two inverted low ground mass artifacts (i.e., artifact A (408), artifact B (406)) may be created in the capacitive image. The two inverted low ground mass artifacts (i.e., artifact A (408), artifact B (406)) do not reflect any actual input objects in the sensing region, but rather are created by the retransmission of signal from the stationary input object (404) to the moving input object (402) and the retransmission of signal from the moving input object (402) to the stationary input object (404).

FIG. 4.2 shows a table of graphs of capacitive images corresponding to the example of FIG. 4.1 in accordance with one or more embodiments of the invention. In particular, FIG. 4.2 shows the graphs of capacitive images as the stationary input object remains in the location shown in FIG. 4.1 and the moving input object moves as shown in FIG. 4.1.

In FIG. 4.2, column 1 (i.e., left column) (420) shows a set of graphs without modification of pixels response values. Column 2 (i.e., right column) (422) shows a set of graphs with a −33% negative multiplier applied to pixels having a negative response value. The rows of FIG. 4.2 show a progression of the capacitive image as the moving input object moves toward the center of the sensing region to align with the stationary input object. In other words, row 1 shows time t1 (424) when the input objects are diagonal from each other, row 2 shows time t2 (426) when the moving input object starts moving toward the horizontal line of the stationary input object, row 3 shows time t3 (428) when the moving input object is close to the horizontal line of the stationary input object, and row 4 shows time t4 (430) when the moving input object is on the same horizontal line as the stationary input object.

As shown in the graphs, at times t1 and t2 (i.e., row 1 (424), row 2 (426)), without modification (i.e., column 1 (420), two peaks clearly exist and may be used to identify the moving input object and stationary input object. With modification (i.e., column 2 (422) at times t1 and t2 (i.e., row 1 (424), row 2 (426)), four peaks exist. However, because the negative multiplier is less than the positive multiplier, the peaks corresponding to the artifacts is less than the peaks created by the input objects. Thus, the positional information for the input objects may be determined by selecting the two greater peaks.

When the moving input object moves toward the same horizontal line at time t3 (i.e., row 3 (428)), the actual input objects start to disappear in column 1 (420) when no modification is performed. However, with the modification of applying the negative pixel multiplier, the capacitive image still reflects the two peaks as shown in column 2 (422) and row 3 (428). Similarly, in row 4 (430), no input object is detectable when no modification is performed as shown in column 1 (420), and two input objects are detectable as shown with the peaks when the modification is performed as shown in column 2 (422). Thus, as shown by way of the example, by embracing the artifacts, one or more embodiments of the invention may detect input objects even when the retransmission might cause such input objects to disappear in the capacitive image.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for a capacitive sensing device, the processing system comprising:
   sensor circuitry configured to be coupled to a plurality of transmitter electrodes and a plurality of receiver electrodes, the sensor module configured to transmit transmitter signals with the plurality of transmitter electrodes and receive a plurality of resulting signals with the plurality of receiver electrodes, the plurality of resulting signals comprising effects corresponding to the transmitter signals; and
   determination circuitry configured to:
      determine a plurality of response values from the plurality of resulting signals,
      determine, when a first response value of the plurality of response values is a negative value, a first adjusted response value by applying a negative multiplier to the first response value, wherein the negative multiplier is between zero and negative one, exclusive,
      determine positional information for a first input object based on at least one of the first adjusted response value and a second response value of the plurality of response values, wherein the second response value is a positive response value, and
      report the positional information.

2. The processing system of claim 1, wherein the determination circuitry is further configured to apply a positive multiplier to the second response value to obtain a second adjusted response value, wherein the positional information is determined using the second adjusted response value.

3. The processing system of claim 2, wherein the absolute value of the negative multiplier is less than the positive multiplier.

4. The processing system of claim 1, wherein the negative multiplier is adjustable.

5. The processing system of claim 1, wherein the determination circuitry is further configured to determine whether a low ground mass environment of the capacitive sensing device exists, wherein the first adjusted response value is determined based on the low ground mass environment being determined to exist.

6. The processing system of claim 1, wherein the determination circuitry is further configured to limit a number of input objects that are reported.

7. The processing system of claim 1, wherein the determination circuitry is further configured to determine the positional information for the first input object based on the second response value and determine the positional information for a second input object based on the first adjusted response value.

8. An input device comprising:
an array of sensor electrodes configured to sense input objects in a sensing region of the input device; and
a processing system configured to:
determine a plurality of response values from a plurality of resulting signals received using the array of sensor electrodes,
determine, when a first response value of the plurality of response values is a negative value, a first adjusted response value by applying a negative multiplier to the first response value, wherein the negative multiplier is between zero and negative one, exclusive,
determine positional information for a first input object based on at least one of the first adjusted response value and a second response value of the plurality of response values, wherein the second response value is a positive response value, and
report the positional information.

9. The input device of claim 8, wherein the processing system is further configured to apply a positive multiplier to the second response value to obtain a second adjusted response value, wherein the positional information is determined using the second adjusted response value.

10. The input device of claim 9, wherein the absolute value of the negative multiplier is less than the positive multiplier.

11. The input device of claim 8, wherein the negative multiplier is adjustable.

12. The input device of claim 8, wherein the processing system is further configured to determine whether a low ground mass environment of the capacitive sensing device exists, wherein the first adjusted response value is determined based on the low ground mass environment being determined to exist.

13. The input device of claim 8, wherein the processing system is further configured to limit a number of input objects that are reported.

14. The input device of claim 8, wherein the processing system is further configured to determine the positional information for the first input object based on the second response value and determine the positional information for a second input object based on the first adjusted response value.

15. A method for low ground mass artifact management comprising:
determining a plurality of response values from a plurality of resulting signals of a capacitive input device;
determining that a first response value of the plurality of response values is a negative value;
determining, based on determining that the first response value is the negative value, a first adjusted response value by applying a negative multiplier to the first response value, wherein the negative multiplier is between zero and negative one, exclusive;
determining positional information for an input object based on at least one of the first adjusted response value and a second response value of the plurality of response values, wherein the second response value is a positive response value; and
report the positional information.

16. The method of claim 15, further comprising:
applying a positive multiplier to the second response value to obtain a second adjusted response value, wherein the positional information is determined using the second adjusted response value.

17. The method of claim 16, wherein the absolute value of the negative multiplier is less than the positive multiplier.

18. The method of claim 15, further comprising:
determining whether a low ground mass environment of the capacitive sensing device exists, wherein the first adjusted response value is determined based on the low ground mass environment being determined to exist.

19. The method of claim 15, further comprising:
adjusting the negative multiplier.

20. The method of claim 15, further comprising:
determining the positional information for the first input object based on the second response value and determining the positional information for a second input object based on the first adjusted response value.

21. A processing system for a capacitive sensing device, the processing system comprising:
a sensor module configured to be coupled to a plurality of transmitter electrodes and a plurality of receiver electrodes, the sensor module configured to transmit transmitter signals with the plurality of transmitter electrodes and receive a plurality of resulting signals with the plurality of receiver electrodes, the plurality of resulting signals comprising effects corresponding to the transmitter signals; and
a determination module configured to:
determine a plurality of response values from the plurality of resulting signals,
determine, when a first response value of the plurality of response values is a negative value, a first adjusted response value by applying a negative multiplier to the first response value, wherein the negative multiplier is between zero and negative one, exclusive,
determine positional information for a first input object based on at least one of the first adjusted response value and a second response value of the plurality of response values, wherein the second response value is a positive response value, and
report the positional information.

22. A processing system for a capacitive sensing device, the processing system comprising:
sensor circuitry configured to be coupled to a plurality of transmitter electrodes and a plurality of receiver electrodes, the sensor module configured to transmit transmitter signals with the plurality of transmitter electrodes and receive a plurality of resulting signals with the plurality of receiver electrodes, the plurality of resulting signals comprising effects corresponding to the transmitter signals; and
determination circuitry configured to:
determine a plurality of response values from the plurality of resulting signals,
determine a first adjusted response value by applying a negative multiplier to a first response value of the plurality of response values when the first response value is a negative value,
apply a positive multiplier to a second response value to obtain a second adjusted response value, determine positional information for a first input object based on at least one of the first adjusted response value and the second adjusted response value of the plurality of response values when the second response value is a positive response value, and report the positional information, wherein the absolute value of the negative multiplier is less than the positive multiplier.

* * * * *